(12) United States Patent
Johnson

(10) Patent No.: US 6,393,516 B2
(45) Date of Patent: *May 21, 2002

(54) SYSTEM AND METHOD FOR STORAGE MEDIA GROUP PARITY PROTECTION

(75) Inventor: Theodore Johnson, New York, NY (US)

(73) Assignee: AT&T Corporation, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/852,328

(22) Filed: May 10, 2001

Related U.S. Application Data

(63) Continuation of application No. 09/219,830, filed on Dec. 23, 1998.

(51) Int. Cl.[7] .............................................. G06F 11/14
(52) U.S. Cl. ...................... 711/111; 711/114; 711/161; 714/6
(58) Field of Search ................................ 711/114, 161, 711/111; 714/6

(56) References Cited

U.S. PATENT DOCUMENTS

| | | | |
|---|---|---|---|
| 5,487,160 A | | 1/1996 | Bemis ........................ 711/114 |
| 5,557,770 A | * | 9/1996 | Bhide et al. ................. 711/161 |
| 5,584,008 A | * | 12/1996 | Shimada et al. ............ 711/114 |
| 5,598,549 A | | 1/1997 | Rathunde .................... 711/114 |
| 5,734,813 A | * | 3/1998 | Yamamoto et al. ............ 714/6 |
| 5,802,264 A | | 9/1998 | Chen et al. .................... 714/6 |
| 5,974,503 A | * | 10/1999 | Venkatseh et al. .......... 711/114 |
| 6,170,037 B1 | * | 1/2001 | Blumenau ................... 711/114 |

* cited by examiner

*Primary Examiner*—Do Hyun Yoo
*Assistant Examiner*—Jasmine Song
(74) *Attorney, Agent, or Firm*—Oliff & Berridge, PLC

(57) ABSTRACT

A system and method for storage medium group parity protection stores data files and related parity information asynchronously on an array of storage media. Data files can be stored asynchronously, or synchronously in stripes as in RAIT technology, but related parity information is stored asynchronously with respect to the data files. Regions of the storage media are preferably organized into protection groups for which parity information is generated. Parity information is generated on line as data files are stored and maintained in active memory. Once a protection group is filled, the parity information is migrated to more permanent backup storage. As one example, regions of an array of N storage media can constitute a protection group, and once the regions in the protection group are filled with data, parity data for the protection group is migrated from active memory to more permanent backup storage.

22 Claims, 2 Drawing Sheets

SYSTEM AND METHOD FOR STORAGE MEDIA GROUP PARITY PROTECTION

This is a Continuation of application Ser. No. 09/219,830 filed Dec. 23, 1998. The entire disclosure of the prior application is hereby incorporated by reference herein in its entirety.

BACKGROUND OF THE INVENTION

1. Field of Invention

This invention relates to systems and methods for storing information.

2. Description of Related Art

Tape storage is often used as an inexpensive backup for on-line storage, increasing the reliability of computer-stored data by providing a redundant storage location. Additionally, hierarchical storage management (HSM) systems use tape storage to greatly expand the capacity of a fixed disk-based file system. Files are migrated from the disk-resident file system to tape storage when the disk-resident file system runs out of space, and files are migrated from tape to fixed disk when they are referenced. Most files in an HSM system are stored only on tape, and no redundant copy is stored on disk.

One method of storing backup information in an HSM system is to store two copies of the information, i.e., data mirroring. This way, stored information can be reconstructed even if a primary and one backup information source are damaged or lost.

Another method for storing backup information is the Redundant Arrays of Inexpensive Tapes (RAIT) technology. In a RAIT system, a collection of N+1 tapes are aggregated to act as a single virtual tape. In a typical implementation, data files are simultaneously written to blocks of the N tapes in stripes, and the parity information, which is the bit-wise exclusive-OR of data written in the blocks, is stored on the additional tape drive simultaneous with storing the data files on the N tapes. The RAIT system has a higher performance compared to systems that store duplicate copies of information because writing data in parallel to multiple tapes results in high speed storage. However, because data is stored in stripes across multiple tapes in the RAIT system, all of the tapes in a RAIT stripe, i.e., a group of tapes storing a particular set of data, must be mounted and read synchronously to reconstruct a file stored on the tapes. Because data must be synchronously read from tapes in the RAIT stripe, special hardware, or software emulation, for reading the tapes is typically required, and if one of the tape drives is not operating properly, data cannot be properly read from any of the tapes. That is, the system must wait until all of the tapes and associated tape drives are operating properly before any data can be read from the tapes.

SUMMARY OF THE INVENTION

The invention provides a system and method for storing information using a plurality of storage media, such as magnetic tapes, that can be used as part of an HSM system. According to at least one aspect of the invention, storage media that store data files and related parity information are written to asynchronously. That is, data files can be stored in a group of storage media synchronously in stripes similar to that in RAIT, or asynchronously unlike RAIT, but parity data is stored asynchronously with respect to storage of the data files. Thus, data files and related parity data are stored independently of each other.

Protection groups are preferably formed for the storage media, or regions of the storage media, to organize how data is stored on the storage media and how parity information is generated. For example, a protection group can be a collection of N regions from N storage media, one region per storage medium, and parity information is generated and stored for data in each protection group. Parity information is stored so that if one storage medium in a protection group is lost or damaged, data stored on the lost or damaged storage medium can be reconstructed from the remaining storage media and the parity information in the protection group. Preferably, parity information is determined as the exclusive-OR of data in a protection group, but other methods for generating parity information are possible. When a protection group is created, each region in the group is empty. As data is written to a region of a storage medium, the region and the corresponding protection group become filled, and parity information is generated and stored in active memory for the protection group. When the regions in a protection group are completely filled and closed, the protection group is closed and parity information stored in active memory for the protection group can be migrated to more permanent backup storage. Thus, parity data for a protection group can be stored asynchronously with respect to storage of data files for which the parity data is generated.

When a data file is received for storage, a storage medium, or region of a storage medium, can be selected to store the data file. Selection of the storage medium or region can be done in many different ways, including using a "round-robin" allocation scheme or by selecting a storage medium that has the largest number of open regions. Once a storage medium or region is selected, the data file is stored and parity data related to the data file is generated. Parity information can be generated before, during or after the data file is stored.

Since in accordance with one aspect of the invention, data files can be stored within a single region or storage medium, or in a relatively small number of regions or storage media, a file can be restored by accessing a single or relatively small number of storage media. This is in contrast to RAIT storage systems, which store single files in stripes across multiple tapes. In addition, since data files can be stored in an asynchronous fashion with respect to each other, data files can be read from appropriate storage media using commonly available equipment, unlike RAIT storage systems that require multiple tapes be synchronously accessed to restore a data file. That is, according to the invention data can be stored asynchronously, and even in parallel, to multiple storage media. Although data files can be written asynchronously according to the invention, the invention is not limited to asynchronous data file storage. That is, data files can be stored in a stripe across two or more storage media similar to RAIT systems.

Various different storage media management strategies can be used to achieve different goals, such as minimizing parity information active memory storage overhead, minimizing the number of open storage media, minimizing data recovery or reconstruction time, etc. To achieve these goals, adjustments to region size, protection group forming policy and/or parity information storage policy can be made.

These and other aspects of the invention will be appreciated and/or are obvious in view of the following description of the invention.

BRIEF DESCRIPTION OF THE DRAWINGS

The invention is described in connection with the following drawings where reference numerals indicate like elements and wherein.

DETAILED DESCRIPTION OF PREFERRED EMBODIMENTS

As discussed above, the invention provides an information storing system and method that allows rapid and asynchronous access to stored information while providing information loss protection and requiring minimal storage space requirements. In a preferred embodiment of the invention, a protection group is created to organize the storage of information on a plurality of different storage media. The storage media are preferably magnetic tape media, but can be other information storage media, such as optical disk storage, magnetic disk storage, or any other volatile or non-volatile storage media. The protection group is a collection of regions each having a length B bytes on each of N different storage media. When a data file is to be stored, a region, regions, a storage medium or storage media in the protection group are selected, and the entire data file, or a portion of the data file, is stored in the selected region(s) or storage medium(s). As used herein, a region can be a portion of a total storage space in a storage medium, or the entire storage space on the storage medium. When the data file is stored, parity information, or a parity block, is generated for the protection group associated with the region to provide additional information loss protection. The parity block is preferably computed to be the exclusive-OR of data stored in the N regions in the protection group and is maintained in active memory until the protection group is closed. When the protection group is closed, the parity block can be stored in more permanent storage. Thus, if data in one of the N regions is lost, the data can be reconstructed by taking the exclusive-OR of data in the unaffected regions in the protection group with the parity block for the protection group.

Thus, the invention provides a kind of "double backup" system that requires much less storage space than systems that store duplicate copies of data files. In addition, since data files can be stored in a single region or storage medium, or asynchronously across two or more regions or storage media, storage media used to restore a data file can be read asynchronously without specialized equipment. This is in contrast to the RAIT storage systems that synchronously store single data files in a stripe across multiple storage media, and therefore require synchronous access to the multiple storage media to reconstruct a single data file. Thus, the asynchronous nature of the invention allows faster and more convenient data read/write capabilities that do not require specialized synchronous data read/write systems. Another advantage over the RAIT systems is that if two tapes in a RAIT data stripe are lost or damaged, all data in the set of RAIT tapes is lost. However, all data stored in accordance with at least one aspect of the invention is not lost if two or more storage media in a protection group are lost or damaged because data files can be stored asynchronously on one or more storage media.

Figure 1:
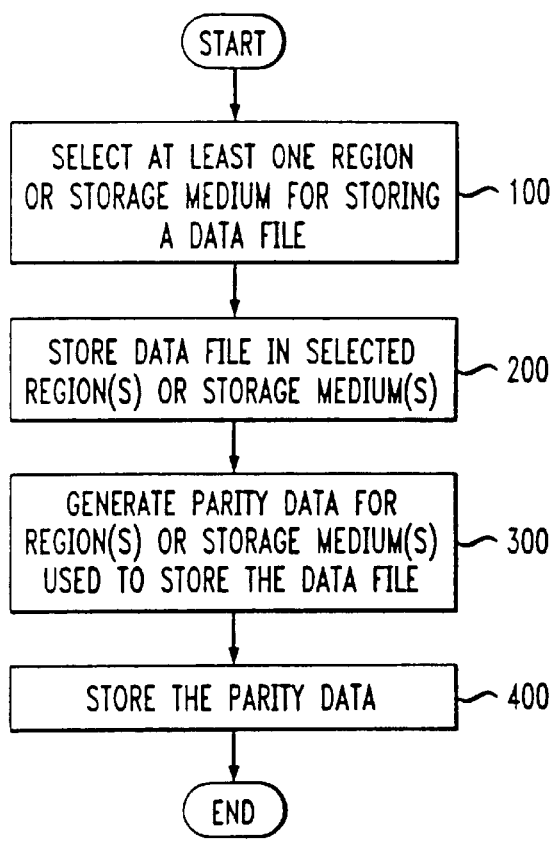
FIG. 1 is a flowchart of steps for a method of storing information in accordance with the invention.

FIG. 1 is a flowchart of steps of a method for storing information in accordance with the invention. In step 100, at least one storage medium or region of a storage medium is selected for storing a data file. Selection of the region(s) or storage medium(s) can be done in many different ways, including a "round-robin" allocation scheme, where a first through Nth region are used to store a first through Nth data files, respectively, and then the first through Nth regions are used to store a N+1th through N+Nth data files, respectively, and so on. A region can also be selected by selecting the region or storage medium that has the largest amount of open storage space, or by selecting a storage medium that has the largest number of open regions. Each storage medium can have one or more regions, as desired. If the data file to be stored is larger than a single region, e.g., is larger than B bytes, a set of regions located on a single storage medium or on more than one storage medium is selected. Alternately, if a data file is to be stored synchronously in a stripe across several storage media, several storage media can be selected.

In step 200, the data file is stored in the selected region(s) or storage medium(s). As discussed above, the data file can be stored in a single region and/or in a single storage medium. However, the data file can be stored in more than one storage medium in a synchronous or asynchronous manner. For example, if a data file is stored in a stripe similar to that used in RAIT technology, the data file is stored synchronously on several storage media.

In step 300, parity data is generated for the regions and/or storage media used to store the data file. The parity data can be generated either before, during or after the storage of each data file. Preferably, the parity data is generated before the data file is stored. This scheme provides maximum data backup protection since parity data is generated for each data file before it is written into storage. Alternately, parity data can be generated after the data file is stored, e.g., after a protection group in which the data file is stored is closed. Preferably, the parity data is generated by determining the exclusive-OR for the regions in a protection group. For purposes of determining the parity data, empty regions or portions of regions are considered to be filled with "zeroes". This process of generating parity data is similar to that in RAIT systems and is well known.

In step 400, the parity data is stored. That is, the parity data is stored asynchronously with respect to the storage of data files related to the parity data. Preferably, the parity data and other information related to the identification and location of regions and parity groups are stored in a database. The parity data can be stored on a media different than that used to store the other information related to the identification and location of regions and parity information, and can be stored on the same type of media used to store the parity protected data. However, neither the parity data nor its related region location information should be stored on the same medium as the data used to generate that piece of parity data. However, the parity information could be stored on one of the storage media that includes regions used to generate the parity data, if desired.

Figure 2:
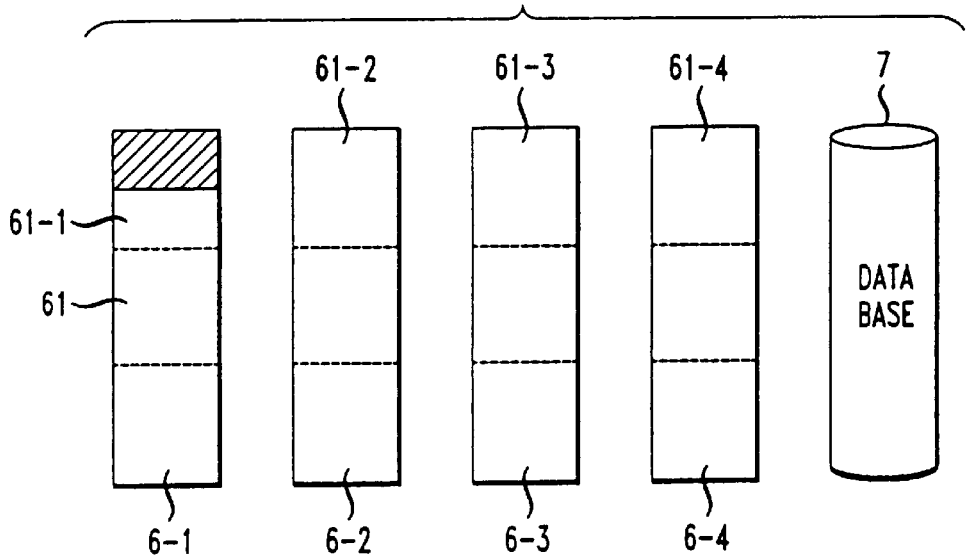
FIG. 2 is a schematic block diagram of storage media and a database.

If protection groups are used to organize how data files are stored and how parity information is generated, additional steps can be performed to manage the protection groups. For example, FIG. 2 shows a schematic diagram of an example set of storage mediums 6-1 through 6-4 and a database 7 that stores parity information. When a data file is received for storage, a region (any of 61-1 through 61-4), a group of regions (61-1 through 61-4), a storage medium (any of 6-1 through 6-4), or group of storage media (6-1 through 6-4) are selected, and the data file is stored. In this example, the data file is stored in a single region 61-1 in the storage medium 6-1 and is shown as a shaded area in the region 61-1. Of course, the data file could completely fill the region 61-1 in the storage medium 6-1, or completely fill the region 61-1 in the storage medium 6-1 and another region 61 in the storage medium 6-1 or another storage medium (any of 6-2 through 6-4). Likewise, the data file could be written synchronously in a stripe across multiple storage media (6-1 through 6-4), e.g., across regions 61 on storage media 61-1 through 61-4.

In this example, a protection group is formed that includes the regions 61-1 through 61-4 in the storage media 6-1 through 6-4. Thus, as data is stored in the regions 61-1 through 61-4, parity information for the protection group is generated and stored in active memory (not shown), e.g., active disk storage. When all of the regions in the protection group are filled and are closed, the protection group is closed and parity data is migrated to the database 7, which can be any type of storage media, including magnetic tape. When the protection group is closed, a new set of storage media, and/or regions, can be opened and a new protection group generated. Alternately, a new storage medium can be opened whenever an existing storage medium (any one of 6-1 through 6-4) in a protection group is closed. When a new storage medium is opened, the current protection group is preferably closed and a new protection group including the new storage medium is opened. This strategy usually reduces the number of parity blocks that are created because storage media 6 typically have varying capacity due to unwritable portions in the storage media 6 and because of data file size uncertainty caused by data compression.

Other or additional storage media management schemes can be used to achieve different goals such as minimizing parity information active memory storage overhead, minimizing the number of open storage media, minimizing data recovery or reconstruction time, etc. To achieve these goals, adjustments to region size, protection group forming policy and/or parity information storage policy can be made. The following are four example strategies that use storage medium groups to manage data file storage. (A storage medium group is a collection of storage media dedicated to storing related data files.)

1. Immediate Strategy

This strategy is designed to fill open protection groups as quickly as possible. The number of regions in a protection group, or the protection width, is set to k and a list of protection groups having less than k regions is maintained. When a new region is opened in response to a region on a storage medium closing, the new region is assigned to an open protection group such that no other region from the same storage medium is a member of the protection group. If no such protection group exists, a new protection group is created. When a protection group is closed, parity information for the protection group is migrated from active storage to a backup storage medium.

This strategy minimizes the active memory storage overhead that is needed to store parity information for open protection groups, since protection groups are closed relatively quickly. However, the time needed to reconstruct a damaged storage medium can be relatively large, since a large number of storage media must be used to read and reconstruct the lost data. Also, media management can be difficult because if a single storage medium is exported and retired, the parity information for a relatively large number of storage media is invalidated. Thus, retiring a single storage medium can require that all potentially invalidated parity blocks be updated.

2. Protection Set Strategy

This strategy attempts to minimize the amount of time needed to rebuild a lost or damaged storage medium by minimizing the number of storage media that must be accessed in the rebuild process. For example, a protection set including k storage media can be constructed so that regions from the k storage media only participate in protection groups with other storage media in the protection set. Thus, if a single storage medium is lost or damaged, only the other k−1 storage media and the parity information need be read to reconstruct the lost or damaged storage medium.

3. Single Storage Medium Group Strategy

This strategy attempts to simplify storage medium management. In this strategy, every protection set contains storage media from a single storage medium group. The storage medium group is written to in a slice of storage media of width s, where s evenly divides the protection width, k. Storage media in a slice should be filled at about the same rate, whether by tape striping techniques, or by writing files to storage media in the slice in parallel streams and allocating new data files to the least-filled storage medium. If the slice width is equal to the protection width (s=k), each storage medium in the protection set should be written to at about the same rate. Thus, protection groups will close shortly after being opened, and parity information can be quickly migrated to more permanent storage. Moreover, setting the slice width equal to the protection width (s=k) increases the likelihood that all storage media in the protection set will be exported or retired at the same time.

4. Multiple Storage Medium Groups

Using multiple storage media groups can have the disadvantage that some storage medium groups do not generate enough migratable data to justify keeping multiple storage media open for the groups. In this case, slices of several storage medium groups can be combined into a single protection set. Some storage medium groups can be constrained to enter protection groups only with each other. For example, slow filling storage medium groups can form protection sets only with other slow filling groups.

In addition to these strategies, the size for individual regions can be adjusted to manage data file storage. Large regions create protection groups that take a long time to fill, but small regions increase the amount of metadata (information about data file location, region location, etc.) that must be managed. Protection set policy can also be modified to organize fractions of a storage medium, rather than whole storage media. While error recovery times can increase, open regions in a protection group might close faster, reducing active storage overhead.

Data file migration (storage in backup storage media) policies can also be used to manage protection groups. For example, data files can be gathered and migrated as a group to minimize the number of open protection groups, close a particular protection group, or organize data files in a desired way with respect to protection groups, etc.

Figure 3:
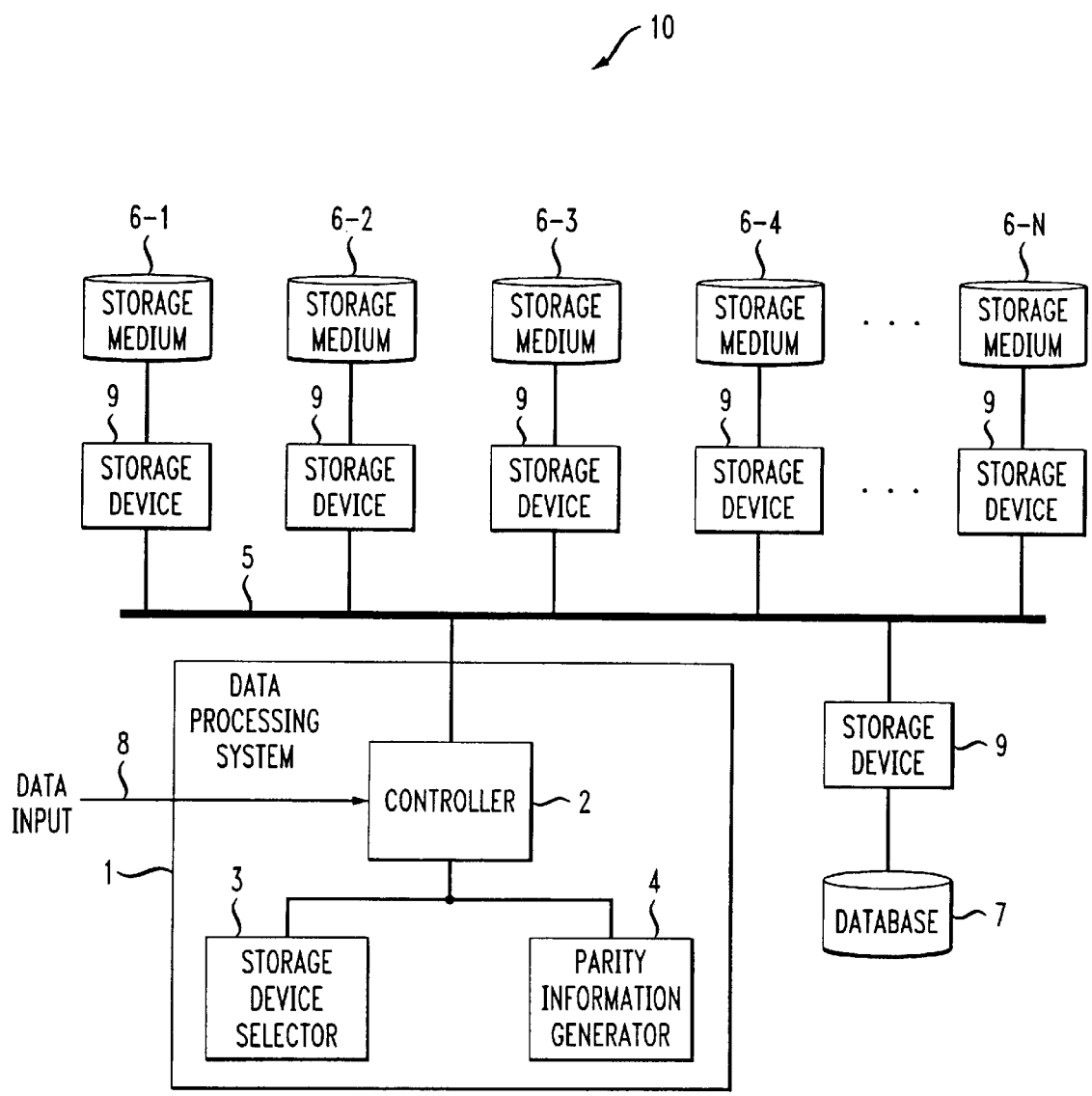
FIG. 3 is a schematic block diagram of an information storage system in accordance with the invention.

FIG. 3 is a schematic block diagram of an information storage system 10 in accordance with the invention. The information storage system 10 includes a data processing system 1, that can be a general purpose computer, or network of general purpose computers, that are programmed to operate in accordance with the invention.

The data processing system 1 also includes at least one controller 2 that can be implemented, at least in part, as a single special purpose integrated circuit, e.g., (ASIC) or an array of ASICs, each having a main or central processor section for overall, system-level control, and separate sections dedicated to performing various different specific computations, functions and other processes under the control of the central processor section. The controller 2 can also be implemented using a plurality of separate dedicated programmable integrated or other electronic circuits or devices, e.g., hard wired electronic or logic circuits such as discrete element circuits or programmable logic devices. The controller 2 also preferably includes other devices, such as volatile or non-volatile memory devices, communications devices, relays and/or other circuitry or components necessary to perform the desired input/output or other functions.

The data processing system 1 also includes a storage medium selector 3 and a parity information generator 4 for selecting a region/storage medium and generating parity information for a protection group, respectively. The storage medium selector 3 and parity information generator 4 can be implemented as software modules that are executed by the controller 2 or any other suitable data processing apparatus. Alternately, the storage medium selector 3 and/or the parity information generator 4 can be implemented as hardwired electronic circuits or other programmed integrated or other electronic circuits or devices, e.g., hardwired electronic or logic circuits such as discrete element circuits or programmable logic devices.

The data processing system 1 communicates with a plurality of storage devices 9 through a bus 5. The storage devices 9 store data on associated storage media 6 and a database 7, which stores parity information and other information, such as region and parity group location information. The storage devices 9 can be any type of well known storage devices that store information on storage media such as magnetic tape, optical disk, magnetic disk, or other storage media, and can be part of a robotic storage media library, for example. Thus, the type of storage devices 9 depends on the type of storage media 6 used to store data. The storage media and the database 7 can be any type of volatile or non-volatile storage medium, but preferably are magnetic tape storage media. The database 7 is used in this example embodiment to more clearly distinguish where data files and parity information is stored. However, information stored on the database 7 can be stored in the storage media. Preferably, however, parity data is stored in storage media that does not include a region for which the parity data was generated.

The controller 2 receives data, such as data files for storage, and/or control information on a data input line 8. When the controller 2 receives a data file for storage, the controller 2 requests the storage medium selector 3 to indicate regions and/or a storage medium within a protection group for storing the data file. As discussed above, the storage medium selector 3 can determine a region, set of regions and/or a storage medium by using a "round-robin" file allocation algorithm, by identifying a storage medium that has the largest number of open regions, identifying regions on multiple storage media for a data stripe, or by some alternate method. Once the location where the data file will be stored is identified, the controller 2 controls the storage of the data file on the selected storage medium. Before, during or after the data file is stored, the parity information generator 4 generates parity information for the protection group(s) in which the data file is stored. Other information, including region and media group location can also be stored in the database 7. The parity information generated by the parity information generator 4 preferably is determined as the exclusive-OR of the regions in the protection group(s). However, other parity information or similar information can be generated. The parity information is preferably stored in active memory, e.g., in the controller 2 or any other storage medium, and migrated to the database 7 when a protection group closes.

Any of the data management techniques described above can be used by the data processing system 1. For example, protection groups can remain open until all of the regions and/or storage media in the protection groups are filled. Thus, the controller 2 could close a current protection group whenever a first region becomes filled, and create a new protection group that includes the storage media that are not yet filled and at least one new storage medium. Alternately, the controller 2 could close a current protection group only when all regions and/or the storage media within the protection group are filled, and create a new protection group that does not include any of the storage media that were included in the earlier closed protection group. Other protection group management schemes can be used depending upon the desired data storage structure. For example, closing a current protection group only when all regions for all storage media in the current protection group are filled, minimizes the number of storage media that must be read to reconstruct information stored on a damaged storage medium. Adding new storage media to a protection group whenever a storage medium in the protection group closes, reduces the number of parity blocks that are created.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for storing data, comprising:

adding at least one region to an open protection group;

creating a correspondence between the at least one added region and a storage medium, wherein regions belonging to the game protection group correspond to different storage media;

storing at least one data file in at least one, but not all, of the regions of the open protection group;

generating parity data for data stored in the regions of the open protection group; and storing the parity data on a storage medium asynchronously with respect to the storing of at least one data file.

2. The method of claim 1, further comprising:

establishing a protection group including N regions of N storage media in a first group.

3. The method of claim 1, wherein the step of storing at least one data file includes selecting at least one of a region and a storage medium to store the data file based on the amount of open storage space in the region.

4. The method of claim 1, wherein the step of storing at least one data file comprises:

storing data asynchronously.

5. The method of claim 1, wherein the step of storing at least one data file comprises:

storing data synchronously.

6. The method of claim 1, wherein the step of storing parity data comprises:

storing parity data when a protection group is closed.

7. The method of claim 1, wherein the step of generating parity data comprises:

generating parity data before, during, or after each data file is stored; and storing the parity data in active memory.

8. The method of claim 1, further comprising:

determining whether at least one region in a first protection group is filled;

closing the first protection group responsive to the determining step; and creating a second protection group, responsive to the determining step, the second protection group including unfilled storage media from the first protection group and at least one new storage medium.

9. The method of claim 1, further comprising:

determining whether at least one region in a first protection group is filled;

closing all regions in the first protection group responsive to the determining step; and creating a second protection group, responsive to the determining step, the second protection group including storage media that are not included in the first protection group.

10. The method according to claim 1, further including establishing the open protection group.

11. The method according to claim 1, wherein the step of storing at least one data file includes selecting at least one of a region and a storage medium to store the data file using a round-robin file allocation scheme.

12. A system for storing data, comprising:

a first component operatively arranged to add at least one region to an open protection group;

a second component operatively arranged to create a correspondence between the at least one region added to the open protection group and a storage medium, wherein regions belonging to the same protection group correspond to different storage media;

a third component operatively arranged to store at least one data file in at least one region, but not all regions, of the open protection group;

a fourth component operatively arranged to generate parity data for data stored in the regions of the open protection group; and a fifth component operatively arranged to store the parity data on a storage medium asynchronously with respect to the storing of at least one data file.

13. The system according to claim 12, further including a sixth component operatively arranged to establish the open protection group.

14. The system according to claim 12, wherein the third component is further arranged to select at least one of a region and a storage medium to store the data file using a round-robin file allocation scheme.

15. The system according to claim 12, wherein the third component is further arranged to select at least one of a region and a storage medium to store the data file based on the amount of open storage space in the region.

16. The system according to claim 12, further comprising:

a sixth component operatively arranged to establish a protection group including N regions of N storage media in a first group.

17. The system according to claim 12, wherein the third component is further arranged to store data asynchronously.

18. The system according to claim 12, wherein the third component is further arranged to store data synchronously.

19. The system according to claim 12, wherein the fifth component is further arranged to store parity data when a protection group is closed.

20. The system according to claim 12, wherein the fourth component is further arranged to generate parity data before, during, or after each data file is stored, and wherein the fourth component is arranged to store the parity data in active memory.

21. The system according to claim 12, further comprising a sixth component that is operatively arranged:

to determine whether at least one region in a first protection group is filled;

to close the first protection group responsive to determining that at least one region in the first protection group is filled; and to create a second protection group, responsive to determining that at least one region in the first protection group is filled, the second protection group including unfilled storage media from the first protection group and at least one new storage medium.

22. The system according to claim 12, further comprising a sixth component that is operatively arranged:

to determine whether at least one region in a first protection group is filled;

to close all regions in the first protection group responsive to determining that at least one region in the first protection group is filled; and to create a second protection group, responsive to determining that at least one region in the first protection group is filled, the second protection group including storage media that are not included in the first protection group.

* * * * *